(12) United States Patent
Matsumoto et al.

(10) Patent No.: US 10,377,881 B2
(45) Date of Patent: Aug. 13, 2019

(54) COMPOSITION AND MOLDED ARTICLE

(71) Applicants: AKITA UNIVERSITY, Akita-shi, Akita (JP); DAIKIN INDUSTRIES, LTD., Osaka-Shi, Osaka (JP)

(72) Inventors: Kazuya Matsumoto, Akita (JP); Mitsutoshi Jikei, Akita (JP); Kunio Nishi, Akita (JP); Tsuyoshi Noguchi, Osaka (JP); Fumihiro Kamiya, Osaka (JP)

(73) Assignees: Akita University, Akita (JP); DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/551,778

(22) PCT Filed: Feb. 17, 2016

(86) PCT No.: PCT/JP2016/054535
§ 371 (c)(1),
(2) Date: Aug. 17, 2017

(87) PCT Pub. No.: WO2016/133108
PCT Pub. Date: Aug. 25, 2016

(65) Prior Publication Data
US 2018/0030246 A1    Feb. 1, 2018

(30) Foreign Application Priority Data
Feb. 20, 2015    (JP) .................. 2015-032014

(51) Int. Cl.
*C08K 5/5419*    (2006.01)
*C08L 27/12*    (2006.01)
(Continued)

(52) U.S. Cl.
CPC ............ *C08K 5/5419* (2013.01); *C08G 69/12* (2013.01); *C08K 5/0025* (2013.01);
(Continued)

(58) Field of Classification Search
CPC .......... C08L 27/12; C08L 27/14; C08L 27/16; C08L 27/18; C08L 27/20
See application file for complete search history.

(56) References Cited

U.S. PATENT DOCUMENTS 5,187,222 A    2/1993    Abe et al.
6,642,300 B1    11/2003    Kawaguchi et al.
(Continued)

FOREIGN PATENT DOCUMENTS

JP    2-219848 A    9/1990
JP    6-302527 A    10/1994
(Continued)

OTHER PUBLICATIONS

Sigma-Aldrich's Dendrimers, downloaded on Oct. 17, 2018.*
(Continued)

*Primary Examiner* — Vu A Nguyen
(74) *Attorney, Agent, or Firm* — Sughrue Mion, PLLC (57) ABSTRACT

The invention provides a composition capable of providing a molded article that has excellent heat resistance and a small weight change against both fluorine plasma exposure and oxygen plasma exposure during a semiconductor manufacturing step. The composition contains a fluorine-containing polymer and a cage silsesquioxane having a specific structure.

12 Claims, 2 Drawing Sheets

(51) Int. Cl.

| | | |
|---|---|---|
| *C08L 77/00* | (2006.01) | |
| *C08L 83/10* | (2006.01) | |
| *C08G 69/12* | (2006.01) | |
| *C08K 5/00* | (2006.01) | |
| *C08K 5/5415* | (2006.01) | |

(52) U.S. Cl.
CPC ............ *C08K 5/5415* (2013.01); *C08L 27/12* (2013.01); *C08L 77/00* (2013.01); *C08L 83/10* (2013.01)

(56) References Cited

U.S. PATENT DOCUMENTS

| | | | | |
|---|---|---|---|---|
| 7,193,015 | B1* | 3/2007 | Mabry ................. | B82Y 30/00 525/101 |
| 2003/0045623 | A1 | 3/2003 | Higashino et al. | |
| 2006/0083925 | A1* | 4/2006 | Laine ................. | C07F 7/21 428/405 |
| 2006/0235140 | A1 | 10/2006 | Tanaka et al. | |
| 2007/0073024 | A1* | 3/2007 | Wariishi ............. | C08G 77/045 528/10 |
| 2010/0286327 | A1* | 11/2010 | Moorlag ............. | C08G 77/045 524/496 |
| 2010/0317787 | A1 | 12/2010 | Baghdachi et al. | |
| 2012/0257914 | A1 | 10/2012 | Moorlag et al. | |

FOREIGN PATENT DOCUMENTS

| | | |
|---|---|---|
| JP | 2010-24400 A | 2/2010 |
| JP | 2010-262290 A | 11/2010 |
| JP | 2012-214754 A | 11/2012 |
| WO | 00/64980 A1 | 11/2000 |
| WO | 01/32782 A1 | 5/2001 |
| WO | 2004/094527 A1 | 11/2004 |
| WO | 2012/133557 A1 | 10/2012 |

OTHER PUBLICATIONS

Abbasi et al., Nanoscale Research Letters 2014, 9:247.*
International Search Report for PCT/JP2016/054535 dated May 10, 2016 [PCT/ISA/210].
International Preliminary Report on Patentability dated Aug. 22, 2017 in counterpart international application No. PCT/JP2016/054535.
Communication dated Sep. 26, 2018, from the European Patent Office in counterpart European Application No. 16752494.1.
Yamashita, Tsuneo, et al., "Curable fluoropolymer compositions for packaging optical elements, and their cured products with good light resistance and heat resistance", Chemicals Abstracts Service, Columbia, Ohio, Oct. 5, 2012, XP-002784660 (5 pages total).
Adam J. Meuler et al; "Examination of wettability and surface energy in fluorodecyl POSS/polymer blends"; Soft Matter; 2011; 7; pp. 10122-10134.

* cited by examiner

COMPOSITION AND MOLDED ARTICLE

CROSS REFERENCE TO RELATED APPLICATIONS

This application is a National Stage of International Application No. PCT/JP2016/054535, filed on Feb. 17, 2016, which claims priority from Japanese Patent Application No. 2015-032014, filed on Feb. 20, 2015, the contents of all of which are incorporated herein by reference in their entirety.

TECHNICAL FIELD

The present invention relates to compositions containing a fluorine-containing polymer, and molded articles obtainable therefrom.

BACKGROUND ART

Fluorine-containing elastomers, especially perfluoroelastomers containing a tetrafluoroethylene (TFE) unit have excellent chemical resistance, solvent resistance, and heat resistance. Thus, they are widely used as, for example, sealants in severe environments in the aerospace field, the semiconductor equipment field, the chemical plant field, and the like.

Addition of filler to fluoroelastomers is a known technique to improve characteristics that sealants need to have.

In order to provide a semiconductor equipment sealant having heat resistance, low gas permeability, and stability even against plasma irradiation in an oxygen or $CF_4$ atmosphere, and generating no dust, Patent Literature 1 proposes adding 1 to 50 parts by weight of silica and 1 to 10 parts by weight of an organic peroxide relative to 100 parts by weight of a fluoroelastomer.

In order to improve the plasma resistance and to reduce generation of particles after plasma irradiation, Patent Literature 2 proposes adding fine particles of aluminum oxide having an average particle size of not greater than 0.5 μm to a cross-linkable fluoroelastomer component.

In order to provide a white pigment-containing composition of a peroxide-vulcanizable fluoroelastomer having improved residual compression set, Patent Literature 3 proposes adding ultrafine white carbon particles used in the form of 4 to 5 wt % aqueous solution with a pH of 9 to 12 to a fluoroelastomer.

In order to provide a fluoroelastomer composition capable of maintaining heat resistance and processability in an environment involving direct plasma exposure, such as the inside of a dry etching device, having a small weight change against both fluorine plasma exposure and oxygen plasma exposure during a semiconductor manufacturing step, and generating no foreign substances (particles) in these treatments, Patent Literature 4 proposes adding, to a fluoroelastomer, at least one selected from the group consisting of isoindolinone pigments, quinacridone pigments, diketopyrrolopyrrole pigments, anthraquinone pigments, amine antioxidants, phenol antioxidants, sulfur antioxidants, and phosphorus antioxidants.

Patent Literature 5 discloses a filler which has a small weight change against both oxygen plasma irradiation and $CF_4$ plasma irradiation and which is formed from a synthetic polymer compound containing an amide bond in the main chain or a synthetic polymer compound containing an imide bond. This literature also discloses blending of this filler to a cross-linkable elastomer.

CITATION LIST

Patent Literature

Patent Literature 1: JP H06-302527 A
Patent Literature 2: WO 01/032782
Patent Literature 3: JP H02-219848 A
Patent Literature 4: WO 2004/094527
Patent Literature 5: WO 00/64980

SUMMARY OF INVENTION

Technical Problem

There is still a demand for a technique applicable to further miniaturization of semiconductor devices.

In consideration of the above state of the art, the present invention aims to provide a composition capable of providing a molded article having excellent heat resistance and a small weight change against both fluorine plasma exposure and oxygen plasma exposure during a semiconductor manufacturing step, and a molded article having excellent heat resistance and a small weight change against both fluorine plasma exposure and oxygen plasma exposure during a semiconductor manufacturing step.

Solution to Problem

The inventors performed studies to find that use of a silsesquioxane with a specific structure as a filler provides a molded article having excellent heat resistance and a small weight change against both fluorine plasma exposure and oxygen plasma exposure during a semiconductor manufacturing step.

In other words, the present invention relates to a composition containing a fluorine-containing polymer and a cage siisesquioxane represented by the following formula Formula (1)

In the formula (1), $R^1$ to $R^8$ are each individually a hydrogen atom, a halogen atom, or an organic group.

The fluorine-containing polymer is preferably a fluoroelastomer.

The cage silsesquioxane preferably has a particle size of 0.5 to 15 nm.

The cage silsesquioxane is preferably in the form of a cage silsesquioxane dendrimer.

The cage silsesquioxane dendrimer preferably satisfies that $R^1$ to $R^8$ in the formula (1) each individually contain a terminal group T represented by the following formula (2).

Formula (2)

In the formula (2), $X^1$ and $X^2$ are each individually —$NH_2$, —OH, —SH, or —H. Alternatively, a group represented by the following formula:

may also be used as each of them.

The cage silsesquioxane dendrimer preferably satisfies that $R^1$ to $R^8$ in the formula (1) contain a trivalent group B represented by the following formula (3).

Formula (3)

The dendrimer preferably has a generation number of 1 to 8.

The composition preferably contains the cage silsesquioxane in an amount of 0.5 to 100 parts by mass relative to 100 parts by mass of the fluorine-containing polymer.

The composition preferably further contains a crosslinker.

The composition can be suitably used as a molding material.

A molded article obtainable from the above composition is also one aspect of the present invention.

Advantageous Effects of Invention

Since the composition of the present invention has the aforementioned structure, a molded article obtainable from the composition of the present invention has excellent heat resistance and a small weight change against both fluorine plasma exposure and oxygen plasma exposure during a semiconductor manufacturing step.

Since the molded article of the present invention has the aforementioned structure, it has excellent heat resistance and a small weight change against both fluorine plasma exposure and oxygen plasma exposure during a semiconductor manufacturing step.

DESCRIPTION OF EMBODIMENTS

The present invention will be specifically described hereinbelow.

The composition of the present invention contains a fluorine-containing polymer and a cage silsesquioxane with a specific structure.

For excellent sealability, chemical resistance, and heat resistance, the fluorine-containing polymer is preferably a fluoroelastomer.

The fluoroelastomer may be either a partially fluorinated elastomer or a perfluoroelastomer. For better chemical resistance and heat resistance, a perfluoroelastomer is preferred.

Examples of the partially fluorinated elastomer include vinylidene fluoride (VdF) fluororubber, tetrafluoroethylene (TFE)/propylene (Pr) fluororubber, tetrafluoroethylene (TFE)/propylene/vinylidene fluoride (VdF) fluororubber, ethylene/hexafluoropropylene (HFP) fluororubber, ethylene/hexafluoropropylene (HFP)/vinylidene fluoride (VdF) fluororubber, and ethylene/hexafluoropropylene (HFP)/tetrafluoroethylene (TFE) fluororubber. Preferred is at least one selected from the group consisting of vinylidene fluoride fluororubber and tetrafluoroethylene/propylene fluororubber.

The vinylidene fluoride fluororubber is preferably a copolymer including 45 to 85 mol % of vinylidene fluoride and 55 to 15 mol % of at least one different monomer copolymerizable with vinylidene fluoride. It is preferably a copolymer including 50 to 80 mol % of vinylidene fluoride and 50 to 20 mol % of at least one different monomer copolymerizable with vinylidene fluoride.

In the present description, the amount of each monomer constituting the fluoropolymer can be calculated by any appropriate combination of NMR, FT-IR, elemental analysis, and X-ray fluorescence analysis in accordance with the type of the monomer.

Examples of the at least one different monomer copolymerizable with vinylidene fluoride include monomers such as tetrafluoroethylene (TFE), hexafluoropropylene (HFP), fluoroalkyl vinyl ethers, chlorotrifluoroethylene (CTFE), trifluoroethylene, trifluoropropylene, pentafluoropropylene, trifluorobutene, tetrafluoroisobutene, hexafluoroisobutene, vinyl fluoride, fluoromonomers represented by the formula (6): $CH_2=CFRf^{61}$ (wherein $Rf^{61}$ is a C1-C12 linear or branched fluoroalkyl group), fluoromonomers represented by the formula (7): $CH_2=CH—(CF_2)_n—X^2$ (wherein $X^2$ is H or F; and n is an integer of 3 to 10), and monomers giving a cross-linking site; and non-fluorinated monomers such as ethylene, propylene, and alkyl vinyl ethers. These may be used alone or in any combination. Preferred is at least one selected from the group consisting of TFE, HFP, fluoroalkyl vinyl ethers, and CTFE.

The fluoroalkyl vinyl ethers are each preferably at least one selected from the group consisting of:

fluoromonomers represented by the formula (8): $CF_2=CF—ORf^{81}$ (wherein $Rf^{81}$ is a C1-C8 perfluoroalkyl group);

fluoromonomers represented by the formula (10): $CF_2=CFOCF_2ORf^{101}$ (wherein $Rf^{101}$ is a C1-C6 linear or branched perfluoroalkyl group, a C5-C6 cyclic perfluoroalkyl group, or a C2-C6 linear or branched perfluorooxyalkyl group containing 1 to 3 oxygen atom(s)); and fluoromonomers represented by the formula (11): $CF_2=CFO(CF_2CF(Y^{11})O)_m(CF_2)_nF$ (wherein $Y^{11}$ is a fluorine atom or a trifluoromethyl group; m is an integer of 1 to 4; and n is an integer of 1 to 4).

More preferred is a fluoromonomer represented by the formula (8).

Specific examples of the vinylidene fluoride fluororubber include VdF/HFP rubber, VdF/HFP/TFE rubber, VdF/CTFE rubber, VdF/CTFE/TFE rubber, rubber of VDF and a fluoromonomer of the formula (6), rubber of VDF, a fluoromonomer of the formula (6), and TFE, VDF/perfluoro (methyl vinyl ether) (PMVE) rubber, VDF/PMVE/TFE rubber, and VDF/PMVE/TFE/HFP rubber. The rubber of VDF and a fluoromonomer of the formula (6) is preferably VDF/CH$_2$=CFCF$_3$ rubber, and the rubber of VDF, a fluoromonomer of the formula (6), and TFE is preferably VDF/TFE/CH$_2$=CFCF$_3$ rubber.

The VDF/CH$_2$=CFCF$_3$ rubber is preferably a copolymer containing 40 to 99.5 mol % of VDF and 0.5 to 60 mol % of CH$_2$=CFCF$_3$, more preferably a copolymer containing 50 to 85 mol % of VDF and 20 to 50 mol % of CH$_2$=CFCF$_3$.

The tetrafluoroethylene/propylene fluororubber is preferably a copolymer containing 45 to 70 mol % of tetrafluoroethylene, 55 to 30 mol % of propylene, and 0 to 5 mol % of a fluoromonomer giving a cross-linking site.

The fluoroelastomer may be a perfluoroelastomer. The perfluoroelastomer is preferably at least one selected from the group consisting of TFE-containing perfluoroelastomers, such as copolymers of TFE and a fluoromonomer of the formula (8), (10), or (11) and copolymers of TFE, a fluoromonomer of the formula (8), (10), or (11), and a monomer giving a cross-linking site.

In the case of a TFE/PMVE copolymer, the compositional ratio thereof is preferably (45 to 90)/(10 to 55) (mol %), more preferably (55 to 80)/(20 to 45), still more preferably (55 to 70)/(30 to 45).

In the case of a copolymer of TFE, PMVE, and a monomer giving a cross-linking site, the compositional ratio thereof is preferably (45 to 89.9)/(10 to 54.9)/(0.01 to 4) (mol %), more preferably (55 to 77.9)/(20 to 49.9)/(0.1 to 3.5), still more preferably (55 to 69.8)/(30 to 44.8)/(0.2 to 3).

In the case of a copolymer of TFE and a C4-C12 fluoromonomer of the formula (8), (10), or (11), the compositional ratio thereof is preferably (50 to 90)/(10 to 50) (mol %), more preferably (60 to 88)/(12 to 40), still more preferably (65 to 85)/(15 to 35).

In the case of a copolymer of TFE, a C4-C12 fluoromonomer of the formula (8), (10), or (11), and a monomer giving a cross-linking site, the compositional ratio thereof is preferably (50 to 89.9)/(10 to 49.9)/(0.01 to 4) (mol %), more preferably (60 to 87.9)/(12 to 39.9)/(0.1 to 3.5), still more preferably (65 to 84.8)/(15 to 34.8)/(0.2 to 3).

Copolymers having a compositional ratio outside the above range tend to lose the properties as an elastomer, but to have properties like a resin.

The perfluoroelastomer is preferably at least one selected from the group consisting of copolymers of TFE, a fluoromonomer of the formula (11), and a fluoromonomer giving a cross-linking site, copolymers of TFE and a perfluorovinyl ether of the formula (11), copolymers of TFE and a fluoromonomer of the formula (8), and copolymers of TFE, a fluoromonomer of the formula (8), and a monomer giving a cross-linking site.

The perfluoroelastomer may also be any of the perfluoroelastomers disclosed in WO 97/24381, JP S61-57324 B, JP H04-81608 B, JP H05-13961 B, and the like.

The monomer giving a cross-linking site means a monomer (cure-site monomer) containing a cross-linkable group that gives a fluoropolymer a cross-linking site for forming cross-link by a cross-linker.

The monomer giving a cross-linking site is preferably at least one selected from the group consisting of:

fluoromonomers represented by the formula (12):

$$CX^3{}_2=CX^3-R_f{}^{121}CHR^{121}X^4$$

(wherein $X^3$ is a hydrogen atom, a fluorine atom, or CH$_3$; $R_f{}^{121}$ is a fluoroalkylene group, a perfluoroalkylene group, a fluoro(poly)oxyalkylene group, or a perfluoro(poly)oxyalkylene group; $R^{121}$ is a hydrogen atom or CH$_3$; and $X^4$ is an iodine atom or a bromine atom);

fluoromonomers represented by the formula (13):

$$CX^3{}_2=CX^3-R_f{}^{131}X^4$$

(wherein $X^3$ is a hydrogen atom, a fluorine atom, or CH$_3$; $R_f{}^{131}$ is a fluoroalkylene group, a perfluoroalkylene group, a fluoropolyoxyalkylene group, or a perfluoropolyoxyalkylene group; and $X^4$ is an iodine atom or a bromine atom);

fluoromonomers represented by the formula (14):

$$CF_2=CFO(CF_2CF(CF_3)O)_m(CF_2)_n-X^5$$

(wherein m is an integer of 0 to 5; n is an integer of 1 to 3; $X^5$ is a cyano group, a carboxy group, an alkoxycarbonyl group, an iodine atom, a bromine atom, or —CH$_2$I);

fluoromonomers represented by the formula (15):

$$CH_2=CFCF_2O(CF(CF_3)CF_2O)_m(CF(CF_3))_n-X^6$$

(wherein m is an integer of 0 to 5; n is an integer of 1 to 3; and $X^6$ is a cyano group, a carboxy group, an alkoxycarbonyl group, an iodine atom, a bromine atom, or —CH$_2$OH); and monomers represented by the formula (16):

$$CR^{162}R^{163}=CR^{164}Z-CR^{165}=R^{166}R^{167}$$

(wherein $R^{162}$, $R^{163}$, $R^{164}$, $R^{165}$, $R^{166}$, and $R^{167}$ are the same as or different from each other, and are each a hydrogen atom or a C1-C5 alkyl group; Z is a C1-C18 linear or branched alkylene group which may contain an oxygen atom, a C3-C18 cycloalkylene group, a C1-C10 at least partially fluorinated alkylene or oxyalkylene group, or a (per)fluoropolyoxyalkylene group which is represented by the formula:

$$(Q)_p\text{-}CF_2O-(CF_2CF_2O)_m(CF_2O)_n-CF_2\text{-}(Q)_p\text{-}$$

(wherein Q is an alkylene group or an oxyalkylene group; p is 0 or 1; and m/n is 0.2 to 5) and which has a molecular weight of 500 to 10000.

$X^3$ is preferably a fluorine atom. Rf$^{121}$ and Rf$^{131}$ are each preferably a C1-C5 perfluoroalkylene group. $R^{121}$ is preferably a hydrogen atom. $X^5$ is preferably a cyano group, an alkoxycarbonyl group, an iodine atom, a bromine atom, or —CH$_2$I. $X^6$ is preferably a cyano group, an alkoxycarbonyl group, an iodine atom, a bromine atom, or —CH$_2$OH.

The monomer giving a cross-linking site is preferably at least one selected from the group consisting of CF$_2$=CFOCF$_2$CF(CF$_3$)OCF$_2$CF$_2$CN, CF$_2$=CFOCF$_2$CF(CF$_3$)OCF$_2$CF$_2$COOH, CF$_2$=CFOCF$_2$CF(CF$_3$)OCF$_2$CF$_2$CH$_2$I, CF$_2$=CFOCF$_2$CF$_2$CH$_2$I, CH$_2$=CFCF$_2$OCF(CF$_3$)CF$_2$OCF(CF$_3$)CN, CH$_2$=CFCF$_2$OCF(CF$_3$)CF$_2$OCF(CF$_3$)COOH, CH$_2$=CFCF$_2$OCF(CF$_3$)CF$_2$OCF(CF$_3$)CH$_2$OH, CH$_2$=CHCF$_2$CF$_2$I, CH$_2$=CH(CF$_2$)$_2$CH=CH$_2$, CH$_2$=CH(CF$_2$)$_6$CH=CH$_2$, and CF$_2$=CFO(CF$_2$)$_5$CN, more preferably at least one selected from the group consisting of CF$_2$=CFOCF$_2$CF(CF$_3$)OCF$_2$CF$_2$CN and CF$_2$=CFOCF$_2$CF$_2$CH$_2$I.

For excellent compression set performance at high temperature, the fluoroelastomer preferably has a glass transition temperature of −70° C. or higher, more preferably −60° C. or higher, still more preferably −50° C. or higher. For good cold resistance, the glass transition temperature is preferably 5° C. or lower, more preferably 0° C. or lower, still more preferably −3° C. or lower.

The glass transition temperature can be determined as follows. Specifically, using a differential scanning calorimeter (DSC822e, Mettler-Toledo International Inc.), 10 mg of a sample is heated at a rate of 10° C./min to give a DSC curve, and the temperature is read at the intermediate point of two intersections between each of the extension lines of the base lines before and after the secondary transition of the DSC curve and the tangent line at the inflection point of the DSC curve.

For good heat resistance, the fluoroelastomer preferably has a Mooney viscosity ML(1+20) of 30 or higher, more preferably 40 or higher, still more preferably 50 or higher, at 170° C. For good processability, this Mooney viscosity is preferably 150 or lower, more preferably 120 or lower, still more preferably 110 or lower.

For good heat resistance, the fluoroelastomer preferably has a Mooney viscosity ML(1+20) of 30 or higher, more preferably 40 or higher, still more preferably 50 or higher, at 140° C. For good processability, this Mooney viscosity is preferably 180 or lower, more preferably 150 or lower, still more preferably 110 or lower.

For good heat resistance, the fluoroelastomer preferably has a Mooney viscosity ML(1+10) of 10 or higher, more preferably 20 or higher, still more preferably 30 or higher, at 100° C. For good processability, this Mooney viscosity is preferably 120 or lower, more preferably 100 or lower, still more preferably 80 or lower.

The Mooney viscosity can be determined using a Mooney viscometer MV2000E (Alpha Technologies Inc.) at 170° C., 140° C., or 100° C. in conformity with JIS K6300.

The aforementioned partially fluorinated elastomer and perfluoroelastomer can be produced by a usual method. In order to make the molecular weight distribution of the resulting polymer narrow and control the molecular weight thereof easily, and to introduce an iodine atom or a bromine atom into an end, an iodine compound or a bromine compound may be used as a chain-transfer agent. An example of a polymerization method using an iodine compound or a bromine compound is a method in which emulsion polymerization is performed under pressure in an aqueous medium in the presence of an iodine compound or bromine compound substantially without oxygen (iodine transfer polymerization). Representative examples of the iodine compound or the bromine compound used include compounds represented by the following formula:

(wherein x and y are each an integer of 0 to 2 and satisfy 1≤x+y≤2; and $R^{13}$ is a C1-C16 saturated or unsaturated fluorohydrocarbon group or chlorofluorohydrocarbon group, or a C1-C3 hydrocarbon group, each of which may contain an oxygen atom). The presence of an iodine compound or a bromine compound enables introduction of an iodine atom or a bromine atom into the polymer, and such an atom serves as a cross-linking site.

Examples of the iodine compound and the bromine compound include 1,3-diiodoperfluoropropane, 2-iodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1,2-bromo-4-iodoperfluorobutene-1, and monoiodomonobromo-substituted products of, diiodomonobromo-substituted products of, and (2-iodoethyl)- and (2-bromoethyl)-substituted products of benzene. These compounds may be used alone or in combination.

For good polymerization reactivity, good cross-linking reactivity, and easy availability, preferred are 1,4-diiodoperfluorobutane, 1,6-diiodoperfluorohexane, and 2-iodoperfluoropropane.

The composition of the present invention contains a cage silsesquioxane represented by the following formula (1).

Formula (1)

In the formula (1), $R^1$ to $R^8$ are each individually a hydrogen atom, a halogen atom, or an organic group.

The organic group is preferably an alkyl group, an alkoxy group, or a phenyl group.

The alkyl group and the alkoxy group preferably have a carbon number of 1 to 1000, preferably 1 to 600, more preferably 1 to 400. If the carbon number is 2 or more, two carbon atoms may be coupled via a bond such as an amide bond, an imide bond, an ester bond, a urethane bond, or a carbonate bond.

The alkyl group and the alkoxy group may contain a cyclic structure such as an aromatic ring. The alkyl group and the alkoxy group may contain a group such as an amino group, a nitro group, a carboxy group, a sulfo group, a hydroxy group, a vinyl group, an epoxy group, a silyl group, or an isocyanate group.

The phenyl group may be substituted with one or more substituents.

$R^1$ to $R^8$ preferably contain a cyclic structure such as an aromatic ring. The presence of a cyclic structure such as an aromatic ring in each of $R^1$ to $R^8$ enables radial arrangement of rigid structures at apexes of the cage silsesquioxane lattice and outward arrangement of all the terminal functional groups. This leads to excellent heat resistance and plasma resistance.

For excellent heat resistance and plasma resistance, $R^1$ to $R^8$ are preferably the same atom or group.

The cage silsesquioxane preferably has a particle size of 0.5 to 15 nm, more preferably 1 nm or greater, still more preferably 5 nm or greater, while more preferably 10 nm or smaller. This particle size can be adjusted by the types of $R^1$ to $R^8$.

The cage silsesquioxane is preferably in the form of a cage silsesquioxane dendrimer. The dendrimer includes a cage silsesquioxane skeleton as a core and $R^1$ to $R^8$ as dendrons. The composition containing a cage silsesquioxane dendrimer can provide a molded article having a small weight change against fluorine plasma exposure and oxygen plasma exposure in a semiconductor device manufacturing step. Also, advantageously, the molecular size of the dendrimer can be controlled by the generation number thereof.

The cage silsesquioxane dendrimer preferably satisfies that $R^1$ to $R^8$ in the formula (1) each individually contain a terminal group T represented by the following formula (2).

Formula (2)

In the formula (2), $X^1$ and $X^2$ are each individually —$NH_2$, —OH, —SH, —H, or a group represented by the following formula.

Preferred is —NH$_2$.

For the terminal group T, a group represented by the following formula:

and a group represented by the following formula:

are more preferred.

Examples of the cage silsesquioxane dendrimer include those satisfying that R$^1$ to R$^8$ in the formula (1) contain a trivalent group B represented by the following formula:

wherein L$^1$ and L$^2$ are each individually a divalent group represented by —NH—CO—, —O—CO—, —O—, —CO—, or —OCH$_2$—. L$^1$ and L$^2$ are each preferably a divalent group represented by —NH—CO—.

The trivalent group B is preferably one represented by the following formula (3).

Formula (3)

The cage silsesquioxane dendrimer preferably satisfies that R$^1$ to R$^8$ in the formula (1) each contain a terminal group T and a trivalent group B. It preferably satisfies that the trivalent group B is coupled with a silicon atom of the cage silsesquioxane via a divalent group A represented by —(CH$_2$)$_l$—NH—CO— (where l is an integer of 1 to 5), and preferably satisfies that the trivalent group B is coupled with a silicon atom of the cage silsesquioxane via the above divalent group A and the terminal group T is coupled with the divalent group A via the trivalent group B. Multiple trivalent groups B may be coupled to form a regularly repeating structure.

The cage silsesquioxane dendrimer preferably has a generation number of 1 to 8, more preferably 1 to 6.

Examples of R$^1$ to R$^8$ include the following structures. In the formulas, A is a divalent group represented by —(CH$_2$)$_l$—NH—CO— (where l is an integer of 1 to 5).

The above structures respectively correspond to first- to fifth-generation dendrimers.

A specific example of the structure of R$^1$ to R$^8$ in the second-generation dendrimer is shown below:

wherein A, X$^1$, X$^2$, L$^1$, and L$^2$ are defined in the same manner as mentioned above.

A more specific example of the structure of R$^1$ to R$^8$ in the second-generation dendrimer is shown below.

The composition preferably contains the cage silsesquioxane in an amount of 0.5 to 100 parts by mass relative to 100 parts by mass of the fluorine-containing polymer. The amount thereof is preferably 5 to 50 parts by mass, more preferably 5 to 25 parts by mass. Too small an amount of the cage silsesquioxane exhibits poor reinforceability, while too large an amount of the cage silsesquioxane makes the composition hard, causing poor sealability.

The composition preferably further contains a cross-linker. Examples of the cross-linker include cross-linkers to be used in any of peroxide cross-linking, polyol cross-linking, polyamine cross-linking, triazine cross-linking, oxazole cross-linking, imidazole cross-linking, and thiazole cross-linking.

Cross-linkers to be used in peroxide cross-linking may be any organic peroxide that can easily generate peroxy radicals in the presence of heat or a redox system. Specific examples thereof include 1,1-bis(t-butylperoxy)-3,5,5-trimethylcyclohexane, 2,5-dimethylhexane-2,5-dihydroperoxide, di-t-butyl peroxide, t-butylcumyl peroxide, dicumyl peroxide, α,α-bis(t-butylperoxy)-p-diisopropylbenzene, 2,5-dimethyl-2,5-di(t-butylperoxy)hexane, 2,5-dimethyl-2,5-di(t-butylperoxy)-hexyne-3, benzoyl peroxide, t-butylperoxybenzene, 2,5-dimethyl-2,5-di(benzoylperoxy)hexane, t-butylperoxy maleate, t-butylperoxy isopropyl carbonate, and 1,3-bis(t-butylperoxyisopropyl)benzene. The type and amount of an organic peroxide are usually chosen in consideration of factors such as the amount of active —O—O— and the decomposition temperature.

Any cross-linking aid that is a compound reactive with peroxy radicals and polymer radicals may be used in this case. Examples thereof include multifunctional compounds containing functional groups such as $CH_2=CH-$, $CH_2=CHCH_2-$, and $CF_2=CF-$. Specific examples thereof include triallyl cyanurate, triallyl isocyanurate (TAIC), triacrylformal, triallyl trimellitate, N,N'-n-phenylene bismaleimide, dipropargyl terephthalate, diallyl phthalate, tetraallyl terephthalate amide, triallyl phosphate, bismaleimide, fluorinated triallyl isocyanurate (1,3,5-tris(2,3,3-trifluoro-2-propenyl)-1,3,5-triazine-2,4,6-trione), tris(diallylamine)-S-triazine, triallyl phosphite, N,N-diallylacrylamide, and 1,6-divinyldodecafluorohexane.

Examples of cross-linkers to be used in polyol cross-linking include polyhydric alcohol compounds such as bisphenol A and bisphenol AF.

Examples of cross-linkers to be used in polyamine cross-linking include polyvalent amine compounds such as hexamethylenediamine carbamate, N,N'-dicinnamylidene-1,6-hexanediamine, and 4,4'-bis(aminocyclohexyl)methane carbamate.

Examples of cross-linkers to be used in triazine cross-linking include organotin compounds such as tetraphenyltin and triphenyltin.

Examples of cross-linkers to be used in any of oxazole cross-linking systems, imidazole cross-linking systems, and thiazole cross-linking systems include:

bisdiaminophenyl cross-linkers, bisaminophenol cross-linkers, and bisaminothiophenol cross-linkers represented by the following formula (20):

(20)

(wherein $R^4$ is —$SO_2$—, —O—, —CO—, a C1-C6 alkylene group, a C1-C10 perfluoroalkylene group, a single bond, or a group represented by the following formula:

;

one of $R^5$ and $R^6$ is —$NH_2$ and the other is —$NHR^7$, —$NH_2$, —OH, or —SH; $R^7$ is a hydrogen atom, a fluorine atom, or a monovalent organic group, preferably $R^5$ is —$NH_2$ and $R^6$ is —$NHR^7$; the C1-C6 alkylene group may preferably specifically be a methylene group, an ethylene group, a propylene group, a butylene group, a pentylene group, a hexylene group, or the like, and the C1-C10 perfluoroalkylene group may be a group represented by the following formula:

;

these compounds are known examples of bisdiaminophenyl compounds disclosed in, for example, JP H02-59177 B and JP H08-120146 A);

bisamidrazone cross-linkers represented by the following formula (21):

(21)

(wherein R4 is defined in the same manner as mentioned above, and $R^8$ is

), and bisamidoxime cross-linkers represented by the following formula (22):

(22)

(wherein $R_f^3$ is a C1-C10 perfluoroalkylene group) or the following formula (23):

(23)

(wherein n is an integer of 1 to 10). These bisaminophenol cross-linkers, bisaminothiophenol cross-linkers, and bisdiaminophenyl cross-linkers are conventionally used for cross-linking systems where a cyano group serves as a cross-linking point. Further, they also react with a carboxy group and an alkoxycarbonyl group to form an oxazole ring, thiazole ring, or imidazole ring, providing a cross-linked product.

Particularly preferred examples of the cross-linker include compounds containing multiple 3-amino-4-hydroxyphenyl groups or 3-amino-4-mercaptophenyl groups and compounds represented by the following formula (24):

(24)

(wherein $R^4$, $R^5$, and $R^6$ are defined in the same manner as mentioned above). Specific examples thereof include 2,2-bis(3-amino-4-hydroxyphenyl)hexafluoropropane (common name: bis(aminophenol) AF), 2,2-bis(3-amino-4-mercaptophenyl)hexafluoropropane, tetraaminobenzene, bis-3,4-diaminophenylmethane, bis-3,4-diaminophenylether, 2,2-bis(3,4-diaminophenyl)hexafluoropropane, 2,2-bis[3-amino-4-(N-phenylamino)phenyl]hexafluoropropane, 2,2-bis[3-amino-4-(N-methylamino)phenyl]hexafluoropropane, 2,2-bis[3-amino-4-(N-ethylamino)phenyl]hexafluoropropane, 2,2-bis[3-amino-4-(N-propylamino)phenyl]hexafluoropropane, 2,2-bis[3-amino-4-(N-perfluorophenylamino)phenyl]hexafluoropropane, and 2,2-bis[3-amino-4-(N-benzylamino)phenyl]hexafluoropropane.

For heat resistance, steam resistance, amine resistance, and good cross-linkability, preferred as a cross-linker among these is 2,2-bis[3-amino-4-(N-phenylamino)phenyl] hexafluoropropane.

The cross-linker is preferably present in an amount of 0.05 to 10 parts by mass, more preferably 0.5 to 5 parts by mass, relative to 100 parts by mass of the fluorine-containing polymer. Less than 0.05 parts by mass of the cross-linker tends to cause insufficient cross-linking of the fluorine-containing polymer, while more than 10 parts by mass thereof tends to impair the physical properties of the cross-linked product.

The composition may contain a common filler.

Examples of the common filler include imide fillers having an imide structure such as polyimide, polyamide-imide, and polyetherimide; organic fillers made of engineering plastic (excluding the compound (a)) such as polyarylate, polysulfone, polyethersulfone, polyphenylene sulfide, polyether ether ketone, polyether ketone, and polyoxybenzoate; and inorganic fillers such as fillers of metal oxides (e.g., aluminum oxide, silicon oxide, and yttrium oxide), of metal carbides (e.g., silicon carbide and aluminum carbide), of metal nitrides (e.g., silicon nitride and aluminum nitride), of aluminum fluoride, and of carbon fluoride.

For an effect of shielding a variety of plasma, preferred among these are aluminum oxide, yttrium oxide, silicon oxide, polyimide, and carbon fluoride.

The inorganic fillers and organic fillers may be used alone or in combination of two or more.

The amount of the common filler is preferably 0.5 to 100 parts by mass, more preferably 5 to 50 parts by mass, relative to 100 parts by mass of the fluorine-containing polymer.

For fields where a high purity and non-staining properties are not required, usual additives to be used in a fluorine-containing polymer composition as appropriate, such as fillers, processing aids, plasticizers, and colorants, may be blended with the composition, and one or more of usual cross-linkers and cross-linking aids different from those mentioned above may be blended with the composition.

The composition can be prepared by mixing the above components using a common polymer processing machine, such as an open roll mill, a Banbury mixer, or a kneader. The composition may alternatively be prepared using a closed-type mixer. The composition can be suitably used as a molding material to be molded into a molded article, and can be suitably used as a molding material to be cross-link-molded into a molded article.

The composition, when used as a molding material, may be formed into a preform by any usually known method, such as thermocompression in a mold, injection into a heated mold, or extrusion through an extruder. In production of an extruded article, such as a hose or an electric wire, the molded article can be produced by extrusion and subsequent heat cross-linking with steam, for example.

The cross-linking conditions are as follows.
(Standard Composition)
Fluorine-containing polymer: 100 parts by mass
Cross-linker (2,2-bis[3-amino-4-(N-phenylamino)phenyl]hexafluoropropane): 1 part by mass
Silicon compound: 15 parts by mass
(Standard Cross-Linking Conditions)
Kneading method: roll kneading
Press cross-linking: 180° C. for 20 minutes
Oven cross-linking: 290° C. for 18 hours
Unless otherwise mentioned, cross-linking is performed under these conditions.

The present invention also relates to a molded article obtainable from the above composition.

The molded article of the present invention can suitably be used as a sealant for semiconductor equipment particularly required to have high cleanliness and semiconductor equipment particularly performing high-density plasma irradiation. Examples of the sealant include O-rings, square rings, gaskets, packings, oil seals, bearing seals, and lip seals.

The molded article may also be used as any of various polymer products for semiconductor equipment, such as diaphragms, tubes, hoses, various rubber rolls, and belts. The molded article may also be used as a material for coating or a material for lining.

The semiconductor equipment as used herein is not limited to equipment for manufacturing semiconductors but widely includes general manufacturing equipment used in the semiconductor field required to have high cleanliness, such as equipment for manufacturing liquid crystal panels or plasma panels. Examples thereof include the following.
(1) Etching Systems
Dry etching systems
Plasma etching systems
Reactive ion etching systems
Reactive ion beam etching systems
Sputter etching systems Ion beam etching systems
Wet etching systems
Ashing systems
(2) Cleaning Systems
Dry etching and cleaning systems
UV/$O_3$ cleaning systems
Ion beam cleaning systems
Laser beam cleaning systems
Plasma cleaning systems
Gas etching and cleaning systems
Extraction and cleaning systems
Soxhlet extraction and cleaning systems
High-temperature and high-pressure extraction and cleaning systems
Microwave extraction and cleaning systems
Supercritical extraction and cleaning systems
(3) Exposure Systems
Steppers
Coaters/developers
(4) Polishing Systems
CMP systems
(5) Film Deposition Systems
CVD systems
Sputtering systems
(6) Diffusion and Ion Implantation Systems
Oxidation and diffusion systems
Ion implantation systems

The molded article of the present invention exhibits excellent performance as a sealant of, for example, a CVD system, plasma etching system, reactive ion etching system, ashing system, or excimer laser exposure system.

EXAMPLES

The present invention is described hereinbelow with reference to, but not limited to, examples.
(Particle Size)
The particle size was determined by dynamic light scattering using nano Partica SZ-100 (Horiba, Ltd.).
(Elemental Analysis)
The elemental analysis was performed using an organic elemental analyzer CE-440M (Exeter Analytical Ltd.).

Synthesis Examples 1 to 6 (Production of Dendrimer)

A cage silsesquioxane was produced by the method disclosed in Rapid Commun. Mass Spectrom., 2012, 26, 765-774. Using this cage silsesquioxane, dendrimers of the cage silsesquioxane were produced by the method disclosed in Org. Lett., 2007, 9, 1363-1366. The production procedure of the dendrimers is expressed by the following scheme.

G1 Dendrimer

POSS

Figure 1:
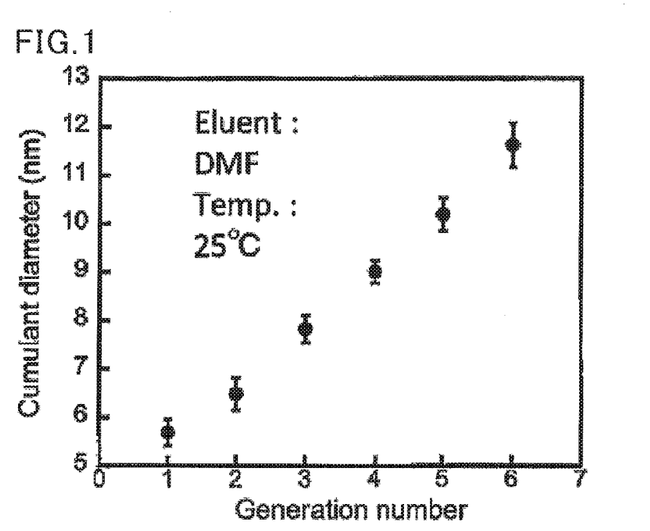
FIG. 1 shows the results of dynamic light scattering measurement of the particle sizes of cage silsesquioxane dendrimers obtained in Synthesis Examples 1 to 6.

The particle sizes of the resulting dendrimers (G1 to G6) were measured. The elemental analysis was performed to confirm the structures of the dendrimers. The results of the elemental analysis are shown in Table 1. The results of the particle size measurement are shown in FIG. 1.

The particle sizes of the dendrimers demonstrate a tendency to increase by about 1 nm for each increase of 1 in generation number.

TABLE 1

|  |  | Compositional formula |  | C (%) | H (%) | N (%) |
|---|---|---|---|---|---|---|
| Synthesis Example 1 | Dendrimer G1 | $C_{80}H_{112}N_{24}O_{20}Si_8$ 2.1$H_2O$ | Measured value (Theoretical value) | 48.16 (48.23) | 5.73 (5.88) | 16.72 (16.87) |
| Synthesis Example 2 | Dendrimer G2 | $C_{192}H_{208}N_{56}O_{28}Si_8$ 11.7$H_2O$ | Measured value (Theoretical value) | 53.72 (53.49) | 5.35 (5.41) | 17.96 (18.19) |
| Synthesis Example 3 | Dendrimer G3 | $C_{416}H_{400}N_{120}O_{68}Si_8$ 21.3$H_2O$ | Measured value (Theoretical value) | 57.22 (56.93) | 5.06 (5.08) | 18.85 (19.15) |
| Synthesis Example 4 | Dendrimer G4 | $C_{864}H_{784}N_{248}O_{132}Si_8$ 29.2$H_2O$ | Measured value (Theoretical value) | 59.50 (59.29) | 5.07 (4.85) | 19.66 (19.84) |
| Synthesis Example 5 | Dendrimer G5 | $C_{1760}H_{1552}N_{504}O_{260}Si_8$ 57.2$H_2O$ | Measured value (Theoretical value) | 60.36 (60.09) | 4.86 (4.77) | 19.80 (20.07) |
| Synthesis Example 6 | Dendrimer G6 | $C_{2552}H_{2088}N_{1016}O_{516}Si_8$ 150.4$H_2O$ | Measured value (Theoretical value) | 60.13 (59.92) | 4.75 (4.80) | 19.78 (19.99) |

Reference Example 1

Figure 2:
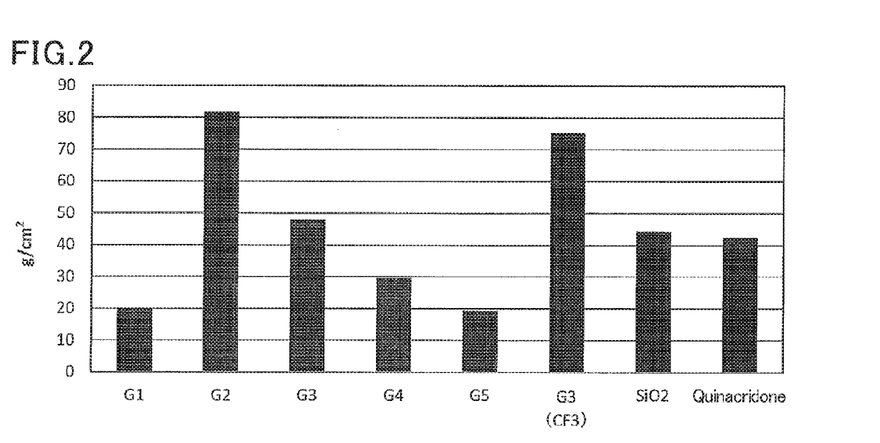
FIG. 2 shows the results of evaluating the weight loss due to $CF_4$ plasma treatment on the cage silsesquioxanes obtained in Synthesis Examples 1 to 5.
Figure 3:
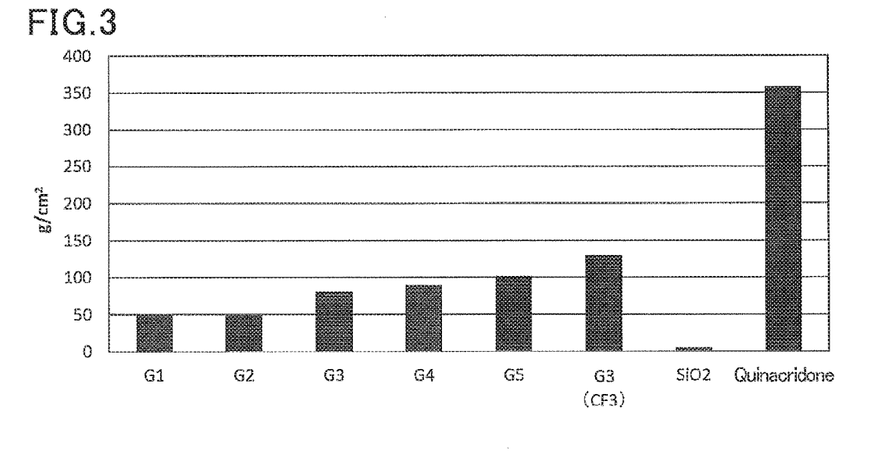
FIG. 3 shows the results of evaluating the weight loss due to $O_2$ plasma treatment on the cage silsesquioxanes obtained in Synthesis Examples 1 to 5.

The resulting dendrimer G1 was subjected to plasma irradiation under the following conditions. The weight thereof was measured before and after the irradiation and the weight change was examined. The results are shown in FIGS. 2 and 3.
Plasma Irradiation System Used:
High density plasma ICP etching system MODEL RIE-101iPH, Samco Inc.
Irradiation Conditions:
Oxygen plasma irradiation (FIG. 3)
Amount of gas flow: 16 sccm
RF output: 400 W
Pressure: 2.6 Pa
Etching time: 15 minutes
$CF_4$ plasma irradiation (FIG. 2)
Amount of gas flow: 16 sccm
RF output: 400 W
Pressure: 2.6 Pa
Etching time: 15 minutes
Irradiation Operation:
The dendrimer G1 was put into an aluminum cup and this cup containing the dendrimer was placed at the center of a RF electrode and irradiated under the aforementioned conditions.
Weight Measurement:
The weight was measured in 0.01 mg increments using an electronic analytical balance BP211D (Sartorius GMBH), and the value in the 0.01 mg place was rounded.

Reference Examples 2 to 6, Comparative Examples 1 and 2

Plasma irradiation was performed and the weight change before and after the irradiation was examined in the same manner as in Reference Example 1 except that one of the dendrimers (G2 to G5 and G3 ($CF_3$)), $SiO_2$, and quinacridone were used. The results are shown in FIGS. 2 and 3.

Example 1

First, 100 parts by mass of a fluoroelastomer and 10 parts by mass of the dendrimer G1 were pre-mixed in 1500 parts by mass of a fluorine-containing solvent. Then, the fluorine-containing solvent was evaporated at 60° C. and the residue was kneaded using an open roll mill. Thereby, a fluoroelastomer composition was obtained. In Table 2, the fluoroelastomer was DAI-EL PERFLUOR GA-105 (Daikin Industries, Ltd.), which is a perfluoroelastomer containing tetrafluoroethylene and a perfluoroalkyl vinyl ether and containing iodine as a cross-linking group. The fluorine-containing solvent used was R-318 (Daikin Industries, Ltd., main component: $C_4F_8Cl_2$).

The resulting fluoroelastomer composition was press-molded at 85° C. for 10 minutes. The resulting molded article was subjected to the plasma resistance evaluation and measurement of 50% mass reduction temperature to be described later. The result of plasma resistance evaluation and the result of measurement of 50% mass reduction temperature are shown in Table 2.

Examples 2 and 3, Comparative Examples 3 and 4

Fluorine-containing elastomer compositions were obtained in the same manner as in Example 1 except that the components of the fluoroelastomer composition were changed as shown in Table 2. Molded articles were obtained from the fluoroelastomer compositions in the same manner as in Example 1. The resulting molded articles were subjected to the plasma resistance evaluation and measurement of 50% mass reduction temperature to be described later. The results of plasma resistance evaluation and the results of measurement of 50% mass reduction temperature are shown in Table 2.

(Plasma Resistance Evaluation)

Each of the molded articles obtained in Examples 1 to 3 and Comparative Examples 3 and 4 was partially covered with an electrically insulating Kapton tape, and then subjected to plasma irradiation under the following conditions. The step between the covered surface and the exposed surface was measured to determine the amount of the material etched. The results are shown in Table 2.

Irradiation Conditions:
  Oxygen plasma irradiation
  Amount of gas flow: 10 sccm
  Bias: −50 V
  Pressure: 4 mTorr
  Etching time: 5 hours Measurement of Amount of Material Etched:

The step between the covered surface and the exposed surface was measured using a stylus profiler DEKTAK 6M (Veeco Instruments Inc.) to determine the amount of the material etched.

(50% Mass Reduction Temperature)

The mass change was measured at an air of 200 ml/min and a heating rate of 10° C./min, and within a temperature range of 20° C. to 600° C. using a thermo-gravimetric analyzer (TG-DTA6200, Seiko Instruments Inc.) to determine the temperature at which the mass was reduced by 50%. The results are shown in Table 2.

Measurement of Amount of Material Etched:

The step between the covered surface and the exposed surface was measured using a laser microscope VK-9700 (Keyence Corp.) to determine the amount of the material etched.

Example 5

This example was performed in the same manner as in Example 4 except that the dendrimer G2 was used instead of the dendrimer G1.

This molded article was subjected to oxygen plasma irradiation under the aforementioned conditions and the amount of the material etched was determined. The result is shown in Table 3.

Example 6

This example was performed in the same manner as in Example 4 except that the dendrimer G3 was used instead of the dendrimer G1.

This molded article was subjected to oxygen plasma irradiation under the aforementioned conditions and the amount of the material etched was determined. The result is shown in Table 3.

Comparative Example 5

This example was performed in the same manner as in Example 4 except that the dendrimer G1 was not blended.

TABLE 2

| | | Example 1 | Example 2 | Example 3 | Comparative Example 3 | Comparative Example 4 |
|---|---|---|---|---|---|---|
| Composition (parts by mass) | Fluorine-containing elastomer | 100 | 100 | 100 | 100 | 100 |
| | Dendrimer G1 | 10 | | | | |
| | Dendrimer G2 | | 10 | | | |
| | Dendrimer G3 | | | 10 | | |
| | SiO$_2$ | | | | | 10 |
| Amount of material etched (nm) | | 2400 | 2400 | 2500 | 3100 | 1900 |
| 50% Mass reduction temperature (° C.) | | 476 | 481 | 475 | 457 | 464 |

Example 4

A bipolymer AFLAS 150P (Asahi Glass Co., Ltd.), Perkadox 14 (Kayaku Akzo Corp.), triallyl isocyanurate (TAIC) (Nippon Kasei Chemical Co., Ltd.), and the dendrimer G1 were mixed at a weight ratio of 100/1/5/10 and kneaded using an open roll mill. Thereby, a cross-linkable fluoroelastomer composition was obtained.

The resulting fluoroelastomer composition was cross-linked at 170° C. for 20 minutes, and further oven-cross-linked in a 200° C. air oven for 4 hours. Thereby, a molded article was obtained.

This molded article was partially covered with an electrically insulating Kapton tape, and then subjected to oxygen plasma irradiation under the following conditions. The step between the covered surface and the exposed surface was measured to determine the amount of the material etched. The results are shown in Table 3.

Oxygen Plasma Irradiation Conditions:
  Amount of gas flow: 16 sccm
  RF output: 400 W
  Pressure: 2.6 Pa
  Etching time: 60 minutes

This molded article was subjected to oxygen plasma irradiation under the aforementioned conditions, and the amount of the material etched was determined. The result is shown in Table 3.

TABLE 3

| | | Example 4 | Example 5 | Example 6 | Comparative Example 5 |
|---|---|---|---|---|---|
| Composition (parts by mass) | Fluorine-containing elastomer | 100 | 100 | 100 | 100 |
| | Dendrimer G1 | 10 | | | |
| | Dendrimer G2 | | 10 | | |
| | Dendrimer G3 | | | 10 | |
| Amount of material etched (nm) | | 22300 | 22500 | 22800 | 25700 |

The invention claimed is:

1. A composition comprising a fluorine-containing polymer and a cage silsesquioxane represented by the following formula (1):

wherein $R^1$ to $R^8$ are each individually a hydrogen atom, a halogen atom, or an organic group,
wherein the cage silsesquioxane is in the form of a cage silsesquioxane dendrimer.

2. The composition according to claim 1,
wherein the fluorine-containing polymer is a fluoroelastomer.

3. The composition according to claim 1,
wherein the cage silsesquioxane has a particle size of 0.5 to 15 nm.

4. The composition according to claim 1,
wherein $R^1$ to $R^8$ in the formula (1) each individually contain a terminal group T represented by the following formula (2):

wherein $X^1$ and $X^2$ are each individually $-NH_2$, $-OH$, $-SH$, $-H$, or a group represented by the following formula:

5. The composition according to claim 1,
wherein $R^1$ to $R^8$ in the formula (1) contain a trivalent group B represented by the following formula (3):

6. The composition according to claim 1,
wherein the dendrimer has a generation number of 1 to 8.

7. The composition according to claim 1,
wherein the cage silsesquioxane is present in an amount of 0.5 to 100 parts by mass relative to 100 parts by mass of the fluorine-containing polymer.

8. The composition according to claim 1, further comprising a cross-linker.

9. The composition according to claim 1, which is a molding material.

10. A molded article obtained from the composition according to claim 1.

11. The composition according to claim 1, wherein $R^1$ to $R^8$ in the formula (1) are the same.

12. The composition according to claim 1, wherein the organic group contains a cyclic structure.

* * * * *